March 23, 1948. C. E. TACK 2,438,483
BRAKE SHOE AND HEAD ARRANGEMENT
Filed July 8, 1944
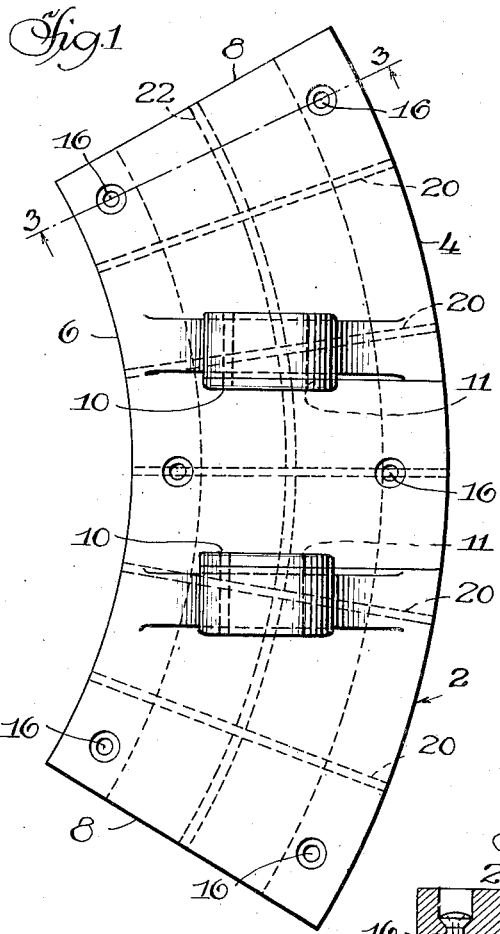
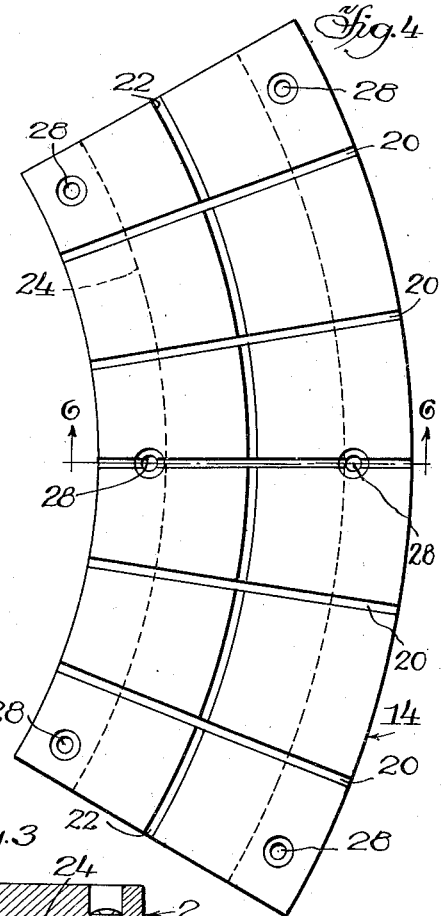
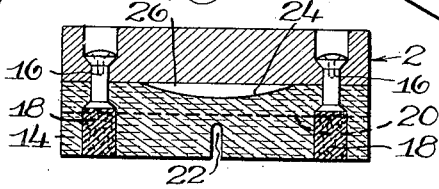
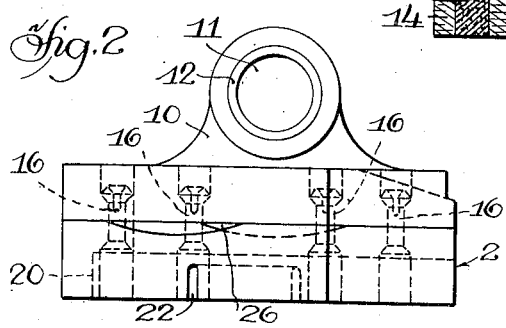
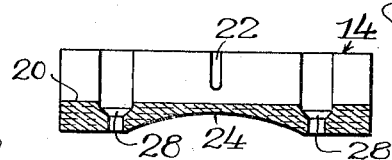
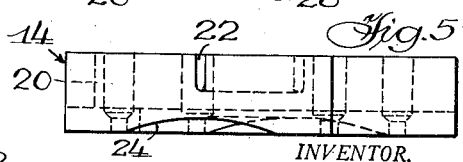
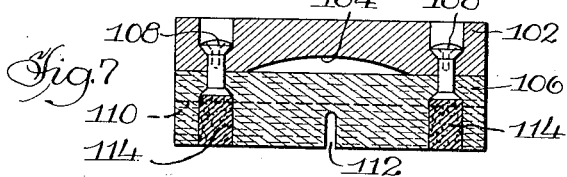
INVENTOR.
Carl E. Tack
BY Orrin O. B. Farmer Atty.

Patented Mar. 23, 1948

2,438,483

UNITED STATES PATENT OFFICE 2,438,483

BRAKE SHOE AND HEAD ARRANGEMENT

Carl E. Tack, Chicago, Ill., assignor to American Steel Foundries, Chicago, Ill., a corporation of New Jersey Application July 8, 1944, Serial No. 544,009

12 Claims. (Cl. 188—234)

My invention relates to braking means and more particularly to a novel form of brake shoe or brake block suitable for special application and particularly adapted for railway brakes of the type commonly designated drum or disc, wherein one or more rotatable elements may be supported on a wheel and axle assembly and provided with suitable braking surfaces.

Experience and theoretical studies as well, have proved that metal to metal brakes function in somewhat different manner as compared with brakes composed of composition material against metal. The ordinary railway brake, of course, is composed of metal to metal, while the type of brake with which we are here primarily concerned consists of some form of composition material bearing against metal. The composition material, of course, as a rule contains more or less metal, which acts as a mechanical bond, preventing separation, and also serves to stabilize the friction coefficient.

The so-called brake block which may be of various types of composition, has a tendency when in use to heat excessively in localized areas. The exact causes of this are not altogether clear but it is well known that the expansion which results from heating of the brake block tends to relieve itself by excessive swelling in certain local areas and this results in the concentration of pressure in those areas and an extremely high energy dissipation demand per unit of area which is believed to be at least in part responsible for so-called thermal cracking of the braking surface with which the brake block has frictional engagement.

Various methods have been tried to eliminate or reduce this localization of pressure, such as, for example, slotting the brake shoes or brake blocks in various manners, but this has not been sufficiently effective to accomplish the desired results. I have discovered a novel means of eliminating the difficulty by providing a special form of brake block mounted on its supporting head in such manner as to avoid development of these excessive pressures by permitting the necessary swelling or expansion in the brake block to be taken up in such manner as not to interfere with the braking effort. I have accomplished this by providing a relief groove at the back of the brake block so that a continuous space extends from one end of the brake block to the other end thereof between said block and the supporting brake head, the groove being of maximum depth along the median line of the length of the block and brake head and arcuately tapering in depth at both sides of said median line toward the lateral edges thereof, thus permitting maximum flexing of the block at its midpoint when loaded. While I have illustrated this as a continuous channel extending the full length of the block to afford a fluid passage between the brake head and the shoe, nevertheless, it is believed that the primary function is to provide an area between the shoe and the supporting head to permit expansion or flow of the brake block material away from the friction surface. It will be understood by those skilled in the art that under loading conditions such as described, a section of the brake block may be considered to be loaded as a beam with maximum load at its midpoint. With a relief cavity provided along the above-mentioned median line and of the form described, center blisters on the brake block are largely avoided and the block is permitted to assume relatively even wear over the entire area thereof so that the life thereof is prolonged and its usefulness greatly increased. It is not believed essential that the passage be continuous although this may facilitate cooling as by fluid flow therebetween. I have illustrated this relieved groove either as formed in the brake head or in the brake block or shoe.

In the drawings,

Figure 1 is a plan view of my novel form of brake head and shoe assembly taken from the lug side of the head where it may be pivotally supported.

Figure 2 is an end view of the assembly shown in Figure 1, taken from the bottom as seen therein, and Figure 3 is a sectional view through the head and shoe taken approximately in the radial plane indicated by the line 3—3 of Figure 1.

Figure 4 is a plan view of my novel form of brake block or brake shoe taken from the friction face thereof. Figure 5 is an end view taken from the bottom as seen in Figure 4, and Figure 6 is a sectional view taken approximately in the radial plane bisecting the shoe as indicated by the line 6—6 of Figure 4.

Figure 7 is a sectional view comparable to that of Figure 3, illustrating a modification of my invention.

Describing in detail my novel brake head and brake shoe assembly, it will be noted that I have illustrated my invention as applied to a segmental type, so-called, wherein the brake head and brake shoe assembly is designed for application to one side of a rotatable brake drum such as may be utilized in railway equipment. The brake head, generally designated 2, of segmental form, may be defined by an outer circumference 4, an inner circumference 6 and radial ends 8, 8. On the rear of the head may be the spaced lugs 10, 10 affording mounting means for the assembly, said lugs having aligned openings 11, 11 bushed as at 12 (Figure 2) for accommodation of the supporting spindle.

On the opposite face of the head may be secured my novel form of brake block, generally designated 14, said block being secured to said head by the radially spaced rows of rivet means 16, 16, the opposite ends of said rivet means being well countersunk within the head and block, respectively. The rivet openings in the brake shoe may be filled, as well seen at 18 in the sectional view of Figure 3, and the brake block or shoe 14 is here illustrated as having a plurality of spaced radial grooves 20, 20 (Figure 4) as well as a circumferential groove 22 extending the full length of the shoe and, of course, intersecting the radial grooves 20, 20. Also, the shoe 14 may be relieved on its head-engaging face by a shallow groove 24, the cross-sectional contour of which is perhaps best shown in Figures 3 and 6, where also the cavity 26 between the shoe and head is clearly illustrated.

The detail of my novel form of friction shoe 14 is shown in Figures 4, 5 and 6, wherein it may be noted that the block is drilled as at 28, 28 for the before-mentioned rivets 16, 16. The sectional view of Figure 6 is taken through one of the radial slots 20 so that the relative depth of the slots 20 and 22 is well illustrated in said figure. The relieved groove 24 is illustrated as relatively shallow with an arcuate contour in section and extends for the full length of the shoe with the same contour throughout. While this is a convenient manner of forming such relief as I have described, particularly from the standpoint of machining operations, nevertheless, experiment has indicated that any relief means suitable to admit the flow or expansion of the brake shoe material under sharp increments of temperature would be satisfactory.

The modification illustrated in Figure 7 is generally similar to that just described except that the brake head 102 is formed with a continuous arcuate groove 104 extending the length thereof in manner similar to that of the previous modification. In the modification of Figure 7 the brake shoe 106 is secured to the brake head 102, as described for the previous modification, by a series of countersunk rivets 108, 108, said rivets being countersunk in the shoe 106 to a point just below the transverse slots 110. The longitudinal slot 112 in the shoe 106 may be somewhat shallower, as in the previous modification, and the rivet openings may be similarly filled or plugged as at 114.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. A segmental brake head and shoe assembly comprising a rigid head having spaced lugs with aligned openings for reception of associated pivotal securing means, and a composition brake shoe having a flat face in complementary engagement with the face of said head, said flat face having a relieved portion defining a shallow, arcuate cavity between said head and shoe continuous from end to end thereof and suitable to accommodate the flow of fluid means therebetween, said cavity also serving to accommodate the expansive flow of the composition material of which said shoe is composed in a direction toward said head and away from the friction surface of said shoe whereby substantially equalized pressure is secured on said friction surface, said shoe having a plurality of intersecting slots on the friction face thereof, said cavity extending approximately halfway across the width of said shoe for the full length thereof.

2. A segmental brake head and shoe assembly comprising a rigid head having spaced lugs with aligned openings for reception of associated pivotal securing means, and a composition brake shoe having a flat face in complementary engagement with the face of said head, said flat face having a relieved portion defining a shallow, arcuate cavity between said head and shoe continuous from end to end thereof and suitable to accommodate the flow of fluid means therebetween, and a plurality of intersecting slots of varying depth in the friction face of said shoe, said cavity being continuous from end to end of said shoe and extending across a substantial portion of the width thereof and having its greatest depth adjacent the middle of said shoe and tapering therefrom to minimum depth adjacent the opposite edges, said cavity being equal to at least one-third the area of said shoe and lying along the median line of its length.

3. An assembly comprising a rigid brake head and a composition brake block secured thereto adjacent the margins thereof, said block having a relieved portion intermediate said margins defining a shallow arcuate cavity between said head and block and being of greatest depth in an area substantially medially between said margins and arcuately decreasing in depth toward the same, said cavity being adapted to accommodate expansion of the material of said block in the region of said cavity toward said head and away from the braking surface of said block coincidentally with the expansion of said material at said margins as said material is expanded by frictional development of heat under service conditions, whereby substantially uniform pressure is secured upon the entire braking surface of said block.

4. A segmental brake head and shoe assembly comprising a rigid head having spaced lugs with aligned openings for reception of associated pivotal securing means, and a composition brake shoe having a flat face in complementary engagement with the face of said head, said flat face having a relieved portion defining a shallow, arcuate cavity between said head and shoe continuous from end to end thereof and suitable to accommodate the flow of fluid means therebetween, said cavity being a shallow, arcuate channel extending from end to end of said shoe adjacent the middle thereof and underlying a substantial portion of said shoe equal to at least one-third of the area thereof.

5. An assembly comprising a rigid brake head and a composition brake block secured thereto adjacent the margins thereof, said head having a relieved portion intermediate said margins defining a shallow arcuate cavity between said head and block and being of greatest depth in an area substantially medially between said margins and arcuately decreasing in depth toward the same, said cavity being adapted to accommodate expansion of the material of said block in the region of said cavity toward said head and away from the braking surface of said block coincidentally with the expansion of said material at said margins as said material is expanded by frictional development of heat under service conditions, whereby substantially uniform pressure is secured upon the entire braking surface of said block.

6. A segmental brake head and shoe assembly comprising a rigid head member having spaced lugs with aligned openings for reception of associated pivotal securing means, and a composition shoe member having a flat face in complementary engagement with an abutting face of said head member, one of said faces having a relieved portion defining a shallow, arcuate cavity between said members continuous from end to end thereof and suitable to accommodate fluid flow therebetween, said cavity being centrally positioned on said face and covering a substantial portion of the area thereof and having its greatest depth adjacent the median line of said face and arcuately tapering in depth at both sides of said median line, whereby, upon application of a load to said brake head and shoe assembly, substantially pressure is secured upon the entire friction face of said shoe.

7. An assembly comprising a rigid brake head member and a composition brake block member secured thereto adjacent the margins thereof, one of said members having a relieved portion intermediate said margins defining a shallow arcuate cavity between said members and being of greatest depth in an area substantially medially between said margins and arcuately decreasing in depth toward the same, said cavity being adapted to accommodate expansion of the material of said block member in the region of said cavity toward said head member and away from the braking surface of said block member coincidentally with the expansion of said material at said margins as said material is expanded by frictional development of heat under service conditions, whereby substantially uniform pressure is secured upon the full braking surface of said block member.

8. An assembly comprising a rigid brake head and a composition brake block secured thereto along the margins thereof, said block having a relieved portion between said margins defining a shallow arcuate cavity between said head and block to permit expansion of the material of said block in the region of said cavity toward said head and away from the braking surface thereof coincidentally with the lateral and longitudinal expansion of said block upon braking application of said assembly and development of heat upon such braking application, said cavity extending over at least one third of the area of said block remote from the lateral margins thereof and having its greatest depth adjacent the median line of the length of said assembly, and a slot in the braking surface of said block extending along the median line of the length of said block.

9. A brake head and shoe assembly comprising a rigid brake head member and a composition brake block member secured thereto adjacent the margins thereof, one of said members having a relieved portion intermediate said margins defining a shallow arcuate cavity between said members and being of greatest depth in an area substantially medially between said members and arcuately decreasing in depth toward the same, said cavity being adapted to accommodate expansion of the material of said block member in the region of said cavity toward said head member and away from the braking surface of said block member coincidentally with the expansion of said material at said margins as said material is expanded by frictional development of heat under service conditions, whereby substantially uniform pressure is secured upon the entire braking surface of said block member, and a plurality of intersecting slots on the braking surface of said block member, at least one of said slots being disposed adjacent the greatest depth of said cavity.

10. A brake head and shoe assembly comprising a riveted head member and a composition brake shoe member secured thereto, one of said members having a relieved portion defining a shallow, arcuate cavity between said members for accommodation of expansion and flow of said composition material under service conditions, said cavity extending for the length of said assembly upon both sides of the median line thereof and having its maximum depth adjacent said median line and arcuately decreasing in depth at both sides thereof to accommodate maximum expansivity of said shoe member along said median line when under stress and thereby reducing the expansion of said shoe member toward the lateral and longitudinal edges thereof.

11. A brake head and shoe assembly comprising a supporting member with a composition supported member, and a relieved portion on one of said members adjacent the other defining a cavity therebetween, said cavity being a shallow, arcuate channel along the length of said members and having an area approximately equal to that of the abutting faces on said members and being positioned along the median line of the length of said assembly and having its maximum depth adjacent said median line to accommodate maximum flexing and expansivity of said supported member along said median line when placed under stress in normal loading.

12. A brake head and shoe assembly comprising a supporting member with a composition supported member, and a relieved portion on one of said members adjacent the other defining a cavity therebetween, said cavity being a shallow, arcuate channel along the length of said members and having an area approximately equal to that of the abutting faces on said members and being positioned along the median line of the length of said assembly and having its maximum depth adjacent said median line and arcuately tapering in depth therefrom toward the lateral edges of said members to permit substantially uniform flexing and expansivity of said supported member, whereby relatively equal pressure is secured on the entire friction face thereof when the same is placed under normal loading stress.

CARL E. TACK.

REFERENCES CITED

The following references are of record in the file of this patent:

UNITED STATES PATENTS

| Number | Name | Date |
|---|---|---|
| 1,513,864 | Schmidt | Nov. 4, 1924 |
| 1,847,680 | Thompson | Mar. 1, 1932 |
| 2,150,186 | Pope | Mar. 14, 1939 |
| 2,163,884 | LaBrie | June 27, 1939 |
| 2,236,311 | Eksergian | Mar. 25, 1941 |
| 2,239,574 | Schell | Apr. 22, 1941 |
| 2,348,077 | Ledwinka | May 2, 1944 |

FOREIGN PATENTS

| Number | Country | Date |
|---|---|---|
| 324,455 | Great Britain | Jan. 30, 1930 |
| 488,382 | Great Britain | July 6, 1938 |

Certificate of Correction

Patent No. 2,438,483.

March 23, 1948.

CARL E. TACK

It is hereby certified that error appears in the printed specification of the above numbered patent requiring correction as follows:

Column 5, line 16, before the word "pressure" insert *equal*;

and that the said Letters Patent should be read with this correction therein that the same may conform to the record of the case in the Patent Office.

Signed and sealed this 21st day of December, A. D. 1948.

[SEAL]

THOMAS F. MURPHY,
*Assistant Commissioner of Patents.*